US012618723B2

(12) United States Patent
Chen

(10) Patent No.: US 12,618,723 B2
(45) Date of Patent: May 5, 2026

(54) ELECTRONIC DEVICE, PARAMETER CALIBRATION METHOD, AND NON-TRANSITORY COMPUTER READABLE STORAGE MEDIUM

(71) Applicant: HTC Corporation, Taoyuan City (TW)

(72) Inventor: Wei-Fan Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 83 days.

(21) Appl. No.: 18/644,127

(22) Filed: Apr. 24, 2024

(65) Prior Publication Data

US 2025/0334459 A1 Oct. 30, 2025

(51) Int. Cl.
*G01L 1/04* (2006.01)
*G06T 7/80* (2017.01)

(52) U.S. Cl.
CPC ................. *G01L 1/04* (2013.01); *G06T 7/80* (2017.01); *G06T 2207/30244* (2013.01)

(58) Field of Classification Search
CPC .... G01L 1/04; G06T 7/80; G06T 2207/30244
See application file for complete search history.

(56) References Cited

U.S. PATENT DOCUMENTS 12,271,517 B1 * 4/2025 Faeulhammer ......... G06F 3/011
2016/0171675 A1 * 6/2016 Tseng .................... G06F 3/0383
345/8
2021/0118401 A1 4/2021 Chi et al.

FOREIGN PATENT DOCUMENTS

| CN | 115455629 A | 12/2022 |
| CN | 116760966 A | 9/2023 |
| CN | 117570834 A | 2/2024 |
| TW | I782700 B | 11/2022 |
| WO | 2023031633 A1 | 3/2023 |

OTHER PUBLICATIONS

Jeong Il Lee et al., "Microfabricated 3D Flexible Tactile Sensor with Table-shaped Structure for Intelligent Robot Fingers", Micro-Nanomechatronics and Human Science (MHS), 2010 International Symposium on, IEEE, Piscataway, NJ, USA, Nov. 7, 2010 (Nov. 7, 2010), pp. 417-419, XP031836303, DOI: 10.1109/MHS.2010. 5669509, ISBN: 978-1-4244-7995-5.
The search report of the corresponding European application No. EP 24178071.7 issued on Nov. 11, 2024.
The office action of the corresponding Taiwanese application No. TW113143663 issued on Sep. 10, 2025.

* cited by examiner

*Primary Examiner* — Richard T Torrente
(74) *Attorney, Agent, or Firm* — CKC & Partners Co., LLC

(57) ABSTRACT

An electronic device is disclosed. The electronic device includes several sensing circuits, several strain sensing circuits, a memory and a processor. The several sensing circuits are configured to obtain several sensing values. The several strain sensing circuits are configured to obtain several strain sensing values. The memory is configured to store a linking database. The linking database includes a linking relationship between several testing strain sensing value groups and several testing external parameter groups in correspondence. The processor is configured to: update several external parameters between the several sensing circuits according to the several strain sensing values and the linking database.

20 Claims, 8 Drawing Sheets

S410 initializing a linking database

S430 updating the external parameters

S410

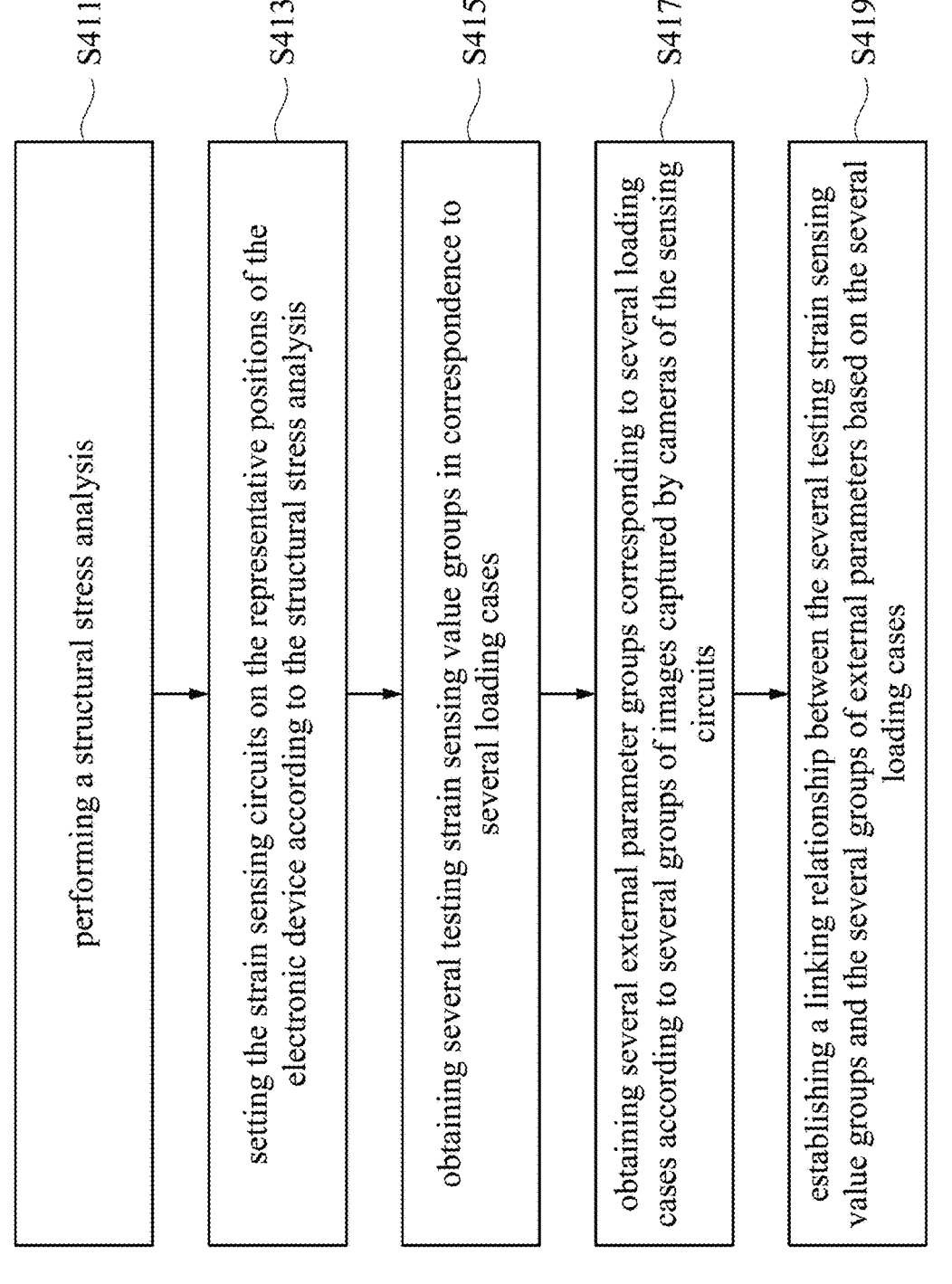

S411
performing a structural stress analysis

S413
setting the strain sensing circuits on the representative positions of the electronic device according to the structural stress analysis S415
obtaining several testing strain sensing value groups in correspondence to several loading cases S417
obtaining several external parameter groups corresponding to several loading cases according to several groups of images captured by cameras of the sensing circuits S419
establishing a linking relationship between the several testing strain sensing value groups and the several groups of external parameters based on the several loading cases

Fig. 5

S439a obtaining the strain sensing values of the current time point and taking the strain sensing values as the initial state of the electronic device S439b re-constructing the linking database with the image-based operations

439

ELECTRONIC DEVICE, PARAMETER CALIBRATION METHOD, AND NON-TRANSITORY COMPUTER READABLE STORAGE MEDIUM

BACKGROUND

Field of Invention

The present application relates to an electronic device, a parameter calibration method, and a non-transitory computer readable storage medium. More particularly, the present application relates to an electronic device, a parameter calibration method, and a non-transitory computer readable storage medium with a self-tracking function.

Description of Related Art

In the future, the development trend of the electronic devices, such as the head-mounted display devices, will inevitably develop in the direction of thinness and lightness. It will be more obvious to use elastic design instead of rigidity in the structural design of the electronic devices such as the HMD devices. However, the opportunity for structural elastic deformation will also be greater. The sensing devices or the sensing circuits set on the electronic devices would become unfixed with the deformation of the electronic devices. The relative positions and the relative rotations between the sensing devices or the sensing circuits of the electronic devices will no longer be fixed values, and corrections for the relative positions and the relative rotations need to be more immediate, faster, and more flexible, so as to maintain the operational performances of the electronic devices.

Several methods are proposed to calibrate the external parameters, including the relative positions and the relative rotations between the sensing devices or the sensing circuits. However, these calibration methods must be carried out through the image captured by the cameras. It requires a long time to collect and analyze data based on the captured images, making it difficult to respond in real time.

Moreover, in the previous methods, only the external parameters between the cameras can be corrected, while other non-image capture devices such as depth sensors and gyroscopes cannot be corrected in real time, which can easily cause positioning errors of the electronic devices during long-term use.

Therefore, how to calibrate the external parameters between the sensing devices or the sensing circuits of the electronic device in real time when the electronic device is structural elastic deformed is a problem to be solved.

SUMMARY

The disclosure provides an electronic device. The electronic device includes several sensing circuits, several strain sensing circuits, a memory and a processor. The several sensing circuits are configured to obtain several sensing values so as to locate the electronic device. The several strain sensing circuits are configured to obtain several strain sensing values in correspondence to a deformation of the electronic device. The memory is configured to store a linking database. The linking database includes a linking relationship between several testing strain sensing value groups and several testing external parameter groups in correspondence. The processor is coupled to the several sensing circuits, the several strain sensing circuits and the memory. The processor is configured to update several external parameters between the several sensing circuits according to the several strain sensing values and the linking database.

The disclosure provides a parameter calibration method suitable for an electronic device. The parameter calibration method includes the following operations: obtaining several sensing values so as to locate the electronic device by several sensing circuits of the electronic device; obtaining several strain sensing values in correspondence to a deformation of the electronic device by several strain sensing circuits of the electronic device; storing a linking database by a memory of the electronic device, in which the linking database includes a linking relationship between several testing strain sensing value groups and several testing external parameter groups in correspondence; and updating several external parameters between the several sensing circuits by a processor of the electronic device according to the several strain sensing values and the linking database.

The disclosure provides a non-transitory computer readable storage medium with a computer program to execute aforesaid parameter calibration method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

FIG. 3A is a schematic diagram illustrating an electronic device before deformation in accordance with some embodiments of the present disclosure.

FIG. 3B is a schematic diagram illustrating a deformation state of the electronic device after deformation in accordance with some embodiments of the present disclosure.

FIG. 5 is a flow chart illustrating an operation as illustrated in FIG. 4 in accordance with some embodiments of the present disclosure.

DETAILED DESCRIPTION

Figure 1:
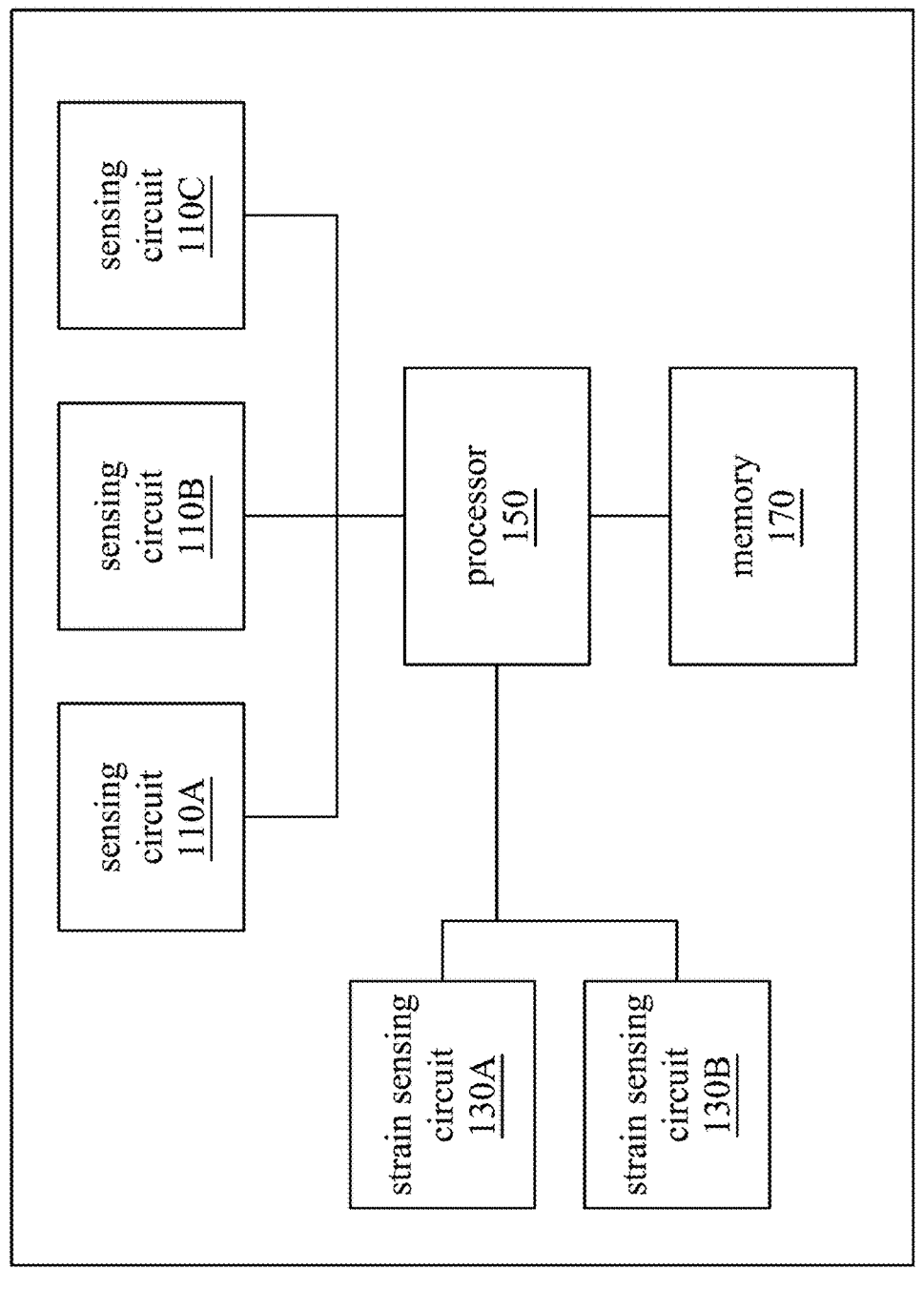
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Reference is made to FIG. 1. FIG. 1 is a schematic block diagram illustrating an electronic device 100 in accordance with some embodiments of the present disclosure. As illustrated in FIG. 1, the electronic device 100 includes several sensing circuits 110A to 110C, several strain sensing circuits 130A and 130B, a processor 150, and a memory 170. The several sensing circuits 110A to 110C, several strain sensing circuits 130A and 130B, and the memory 170 couple to the processor 150.

It should be noted that, the electronic device 100 in FIG. 1 is for illustrative purposes only, and the embodiments of the present disclosure are not limited thereto.

One or more programs are stored in the memory 170 and are configured to be executed by the processor 150, in order to perform a parameter calibration method.

In some embodiments, the electronic device 100 may be an HMD (head-mounted display) device, a tracking device, or any other device with self-tracking function. The HMD device may be wear on the head of a user.

In some embodiments, the memory 170 stores a SLAM (Simultaneous localization and mapping) module. The electronic device 100 may be configured to process the SLAM module. The SLAM module includes functions such as image capturing, features extracting from the image, and localizing according to the extracted features. In some embodiments, the SLAM module include a SLAM algorithm, in which the processor 150 access and process the SLAM module so as to localize the electronic device 100 according to the images captured by the cameras of the electronic device 100. The details of the SLAM system will not be described herein.

Specifically, in some embodiments, the electronic device 100 may be applied in a virtual reality (VR)/mixed reality (MR)/augmented reality (AR) system. For example, the electronic device 100 may be realized by, a standalone head mounted display device (HMD) or VIVE HMD.

In some embodiments, the processor 150 can be realized by, for example, one or more processing circuits, such as central processing circuits and/or micro processing circuits but are not limited in this regard. In some embodiments, the memory 170 includes one or more memory devices, each of which includes, or a plurality of which collectively include a computer readable storage medium. The non-transitory computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In some embodiments, the sensing circuits 110A to 110C may be cameras, depth sensors, gyroscopes, inertial measurement units, or any other circuits with sensing functions. In some embodiments, some of the sensing circuits 110A to 110C may be a camera with image capturing functions, while the other may be the depth sensors, gyroscopes, or inertial measurement units without image capturing functions.

In some embodiments, the strain sensing circuits 130A and 130B may be strain gauges or any circuits with functions of sensing the strain of the electronic device 100.

In some embodiments, the electronic device 100 includes other circuits such as a display circuit and an I/O circuit. In some embodiments, the display circuit covers a field of view of the user and shows a virtual image at the field of view of the user.

Figure 2:
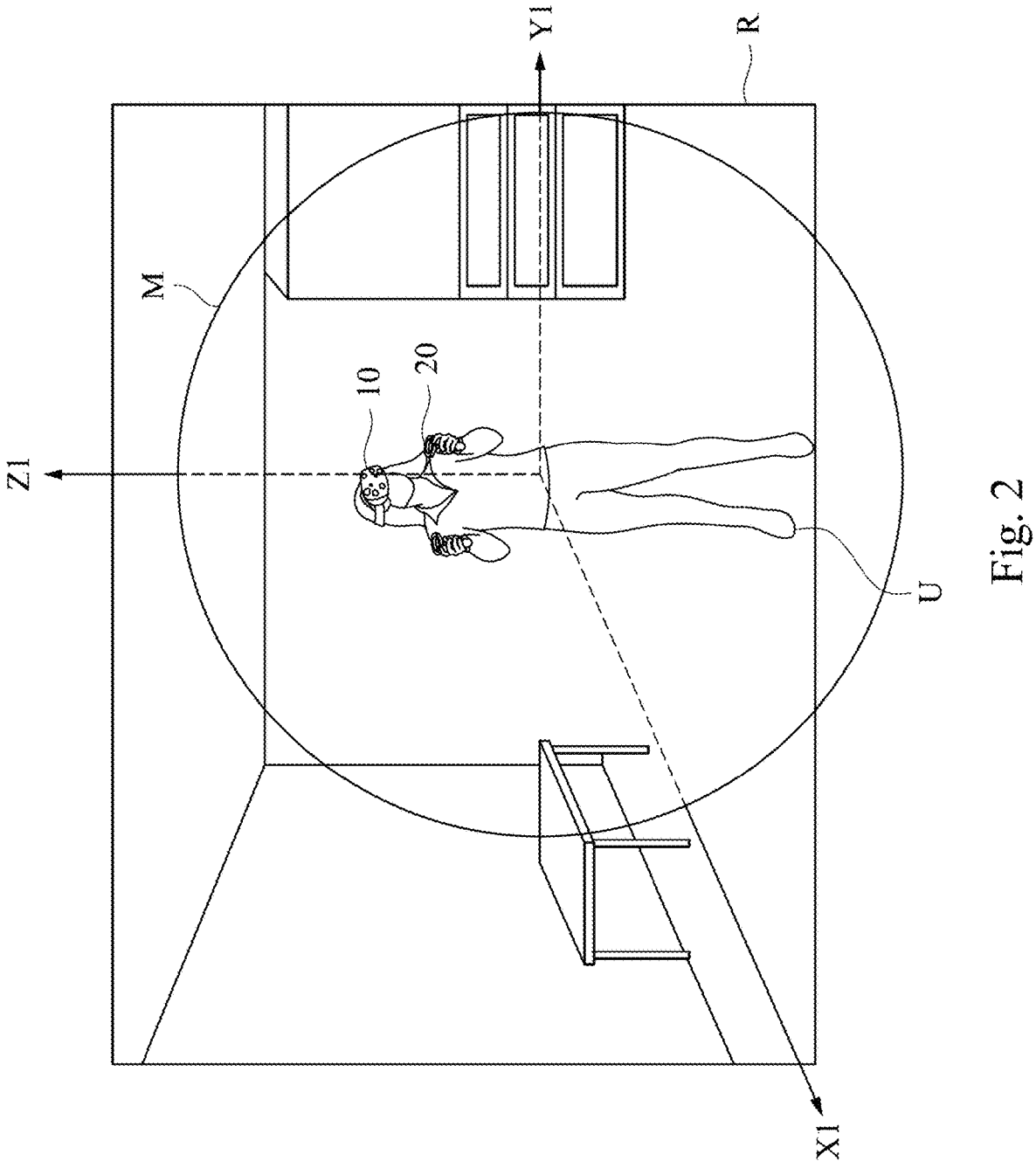
FIG. 2 is a schematic diagram illustrating a user operating the electronic device as illustrated in FIG. 1 in accordance with some embodiments of the present disclosure.

Reference is made to FIG. 2 together. FIG. 2 is a schematic diagram illustrating a user U operating the electronic device 100 as illustrated in FIG. 1 in accordance with some embodiments of the present disclosure.

As illustrated in FIG. 2, the user U is wearing an HMD device 10 on the head and holding a tracking device 20 on the hand. In some embodiments, the HMD device 10 and the tracking device 20 as illustrated in FIG. 2 represent the electronic device 100 as illustrated in FIG. 1.

In some embodiments, the sensing circuits 110A to 110C as illustrated in FIG. 1 obtains several sensing values in correspondence to the real space R in which the electronic device 100 is operated therein. The sensing values may be pictures, inertial measurement data, gravity sensing data, or any other data sensed by the sensing circuits 110A to 110C. In some embodiments, the processor 150 establish an environmental coordinate system M in correspondence to the real space R according to several sensing values obtained by the sensing circuits 110A to 110C. In some embodiments, the processor 150 obtains a device pose of the electronic device 100 within the environmental coordinate system M according to the sensing values, such according to the feature points within the images captured by the cameras. When the electronic device 100 moves in the real space R, the processor 150 tracks the device pose of the electronic device 100 within the environmental coordinate system M. In some embodiments, the processor 150 as illustrated in FIG. 1 locates the electronic device within the environmental coordinate system M established based on the real space R according to the sensing values.

In other embodiments, the environmental coordinate system M could be an augmented reality environmental coordinate system, an extended reality environmental coordinate system, or a mixed reality environmental coordinate system. In some embodiments, the device pose of the electronic device 100 includes a position and a rotation angle.

When calculating the device pose of the electronic device 100 according to the sensing values obtained by the sensing circuits 110A to 110C, the external parameter between the sensing circuits 110A to 110C are considered. In some embodiments, the external parameters of the cameras 150A to 150C include the relative pose and the relative rotation between the sensing circuits 110A to 110C.

Figures 3A, 3B:
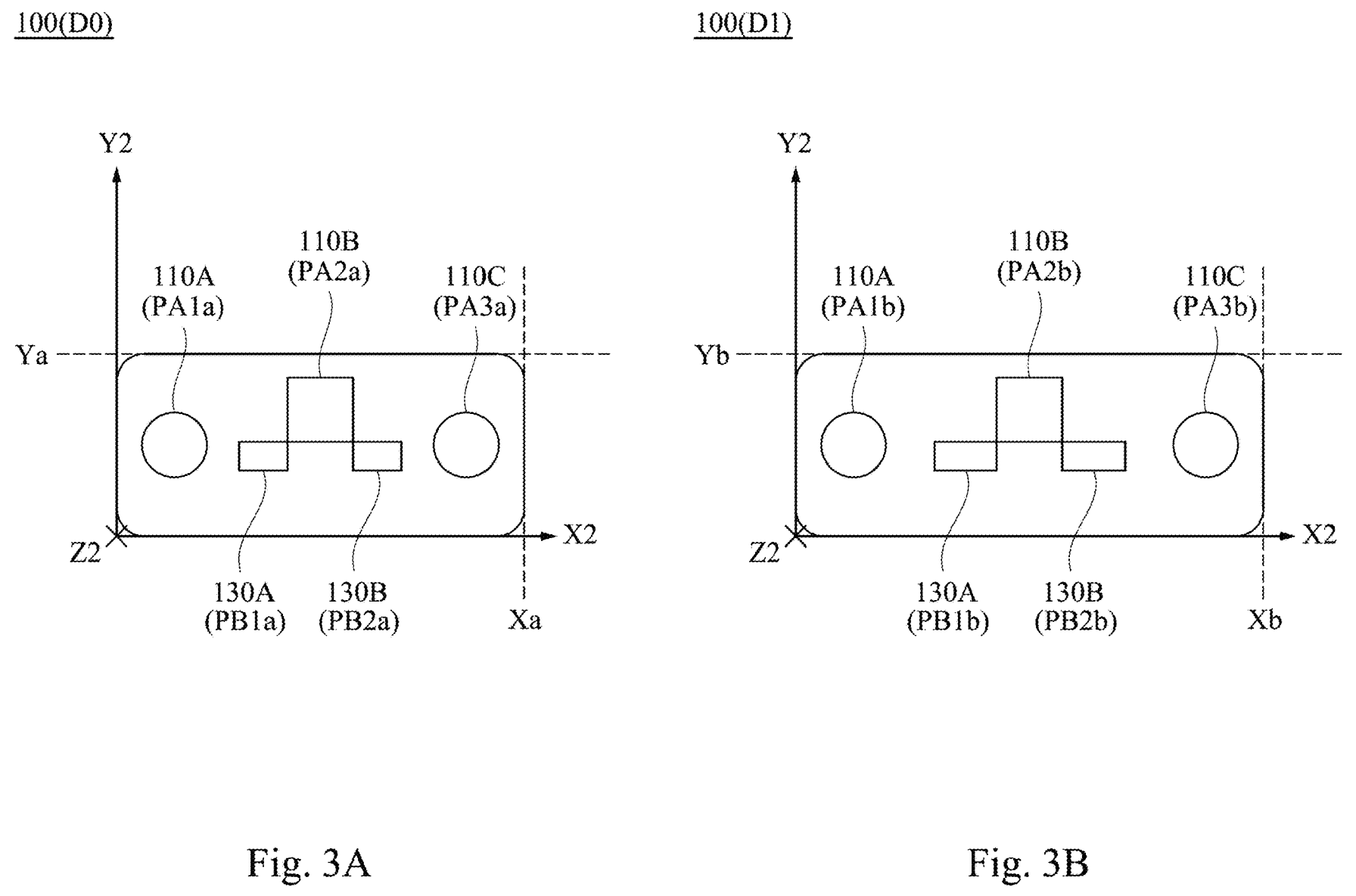

Reference is made to FIG. 3A and FIG. 3B together. FIG. 3A is a schematic diagram illustrating an electronic device 100 before deformation in accordance with some embodiments of the present disclosure. FIG. 3B is a schematic diagram illustrating a deformation state D1 of the electronic device 100 after deformation in accordance with some embodiments of the present disclosure.

When the processor 150 tracks the device pose of the electronic device 100 as illustrated in FIG. 1 within the environmental coordinate system M as illustrated in FIG. 2, the external parameters between each two of the sensing circuits 110A to 110C are considered. However, as illustrated in FIG. 3A to 3B during the operation of the electronic device 100, the relative position and the relative rotation between the sensing circuits 110A to 110C may be changed due to a structural elastic deformation of the electronic device 100, and the pose of the electronic device 100 within the environmental coordinate system M may become inaccurate. Therefore, a method for calibrating the external parameters between the sensing circuits 110A to 110C of the electronic device 100 is in need.

Figure 4:
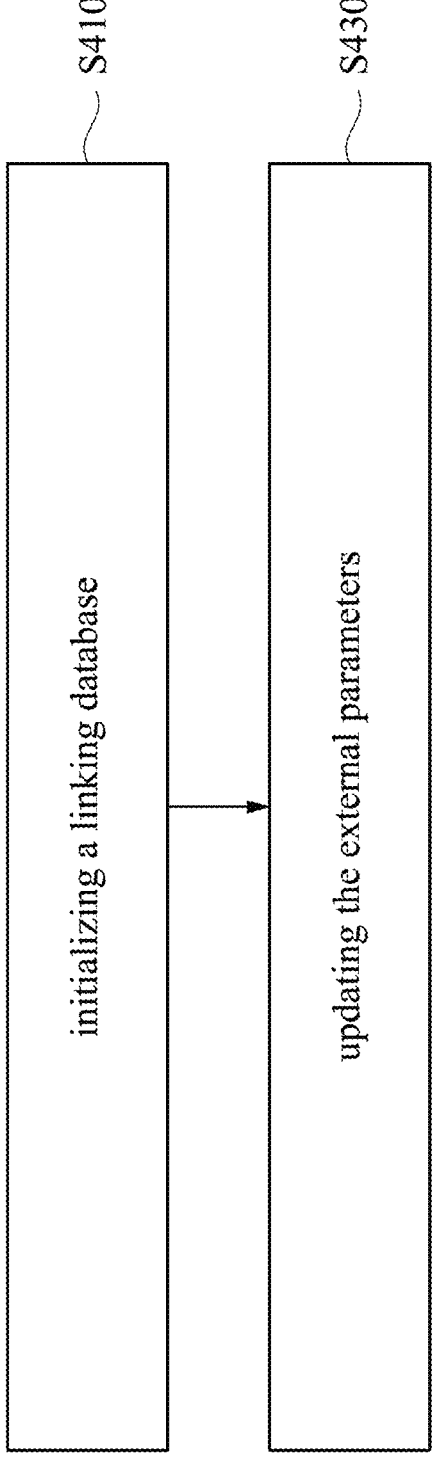
FIG. 4 is a flowchart illustrating a parameter calibration method in accordance with some embodiments of the present disclosure.

Reference is made to FIG. 4. For better understanding of the present disclosure, the detailed operation of the electronic device 100 as illustrated in FIG. 1 will be discussed in accompanying with the embodiments shown in FIG. 4. FIG. 4 is a flowchart illustrating a parameter calibration method 400 in accordance with some embodiments of the present disclosure. It should be noted that the parameter calibration method 400 can be applied to a device having a structured that is the same as or similar to the structured of the electronic device 100 shown in FIG. 1. To simplify the description below, the embodiments shown in FIG. 1 will be used as an example to describe the parameter calibration method 400 in accordance with some embodiments of the present disclosure. However, the present disclosure is not limited to application to the embodiments shown in FIG. 1.

As shown in FIG. 4, the parameter calibration method 400 includes operations S410 to S430.

In operation S410, a linking database is initialized. In some embodiments, operation S410 is performed when the electronic device 100 is being made in the factory. The linking database connects the strain sensing values sensed by the strain sensing circuits 130A and 130B and the external parameters of the sensing circuits 110A to 110C based on the structural deformation behavior of the electronic device 100.

Reference is made to FIG. 5 together. FIG. 5 is a flow chart illustrating operation S410 as illustrated in FIG. 4 in accordance with some embodiments of the present disclosure. As illustrated in FIG. 5, operation S410 includes operations S411 to S419.

In operation S411, a structural stress analysis is performed. In some embodiments, the structural stress analysis is performed so as to mimic several deformation states of the electronic device 100. The structural stress analysis is used to identify the structural deformation behavior during any possible loading situation, and to find out the most critical points to mount the strain sensing circuits 130A and 130B. In some embodiments, the structural stress analysis may be performed by methods such as finite element method or neural network algorithm.

In operation S413, the strain sensing circuits are set on the representative positions of the electronic device according to the structural stress analysis. In some embodiments, in operation S413, the result based on structural stress analysis includes the strain sensing values of any point on the electronic device 100 under different loading. Several most representative positions of the electronic device 100 under all loading cases are obtained. The strain sensing circuits 130A and 130B are then set on at the representative positions of the electronic device 100.

The structural stress analysis only needs to be performed once in the factory for the electronic devices with the same model. Afterwards, the representative positions of all the electronic devices with the same model will be the same when being made in the factory and the linking database of each of the electronic devices can be re-calibrate individually.

In some embodiments, the strain sensing circuits 130A and 130B as illustrated in FIG. 1 are set at the representative positions of the electronic device 100 with the largest testing strain sensing values or with the testing strain sensing values larger than a strain threshold. Reference is made to FIG. 3A together. The coordinate system formed by the directions X2, Y2, and Z2 is a coordinate system constructed based on the electronic device 100, with the origin of the coordinate system located at a corner of the electronic device 100.

As illustrated in FIG. 3A. When the positions PB1*a* and PB2*a* are the representative positions according to the structural stress analysis, the strain sensing circuits 130A and 130B are set at the positions PB1*a* and PB2*a* of the electronic device 100.

In operation S415, several testing strain sensing value groups in correspondence to several loading cases. It should be noted that, the testing strain sensing value groups are obtained when the electronic device is being tested in the factory. Each of the testing strain sensing value groups includes several testing strain sensing values obtained by the strain sensing circuits 130A and 130B.

Reference is made to FIG. 3B. In FIG. 3B, the electronic device 100 is deformed to the deformation state D1. Comparison between FIG. 3A and FIG. 3B is made. In FIG. 3A, the sensing circuits 110A, 110B, and 110C locates at positions PA1*a*, PA2*a*, and PA3*a* of the electronic device 100 respectively. While in FIG. 3B, the sensing circuits 110A, 110B, and 110C locates at positions PA1*b*, PA2*b*, and PA3*b* of the electronic device 100 respectively. The strain sensing circuits 130A and 130B obtains the testing strain sensing values of each representative positions of the electronic device 100 when the electronic device 100 is deformed to the deformation state D1.

In some embodiments, the positions of the strain sensing circuits 130A and 130B may be moved from positions PB1*a* and PB2*a* as illustrated in FIG. 3A to positions PB1*b* and pB2*b* as illustrated in FIG. 3B after deformation.

In operation S415, several testing strain sensing value groups based on different loading cases are obtained. For example, a first testing strain sensing value group are obtained based on a first loading case, a second testing strain sensing value group are obtained based on a second loading case, and so on.

In operation S417, several external parameter groups corresponding to several loading cases are obtained according to several groups of images captured by cameras of the sensing circuits. For example, when the electronic device 100 is deformed based on a first loading case, the sensing circuits 110A to 110C obtains a first image group captured by the cameras of the sensing circuits 110A to 110C. The processor 150 then obtains a first testing external parameter group corresponding to the first loading case according to the images captured by the sensing circuits 110A to 110C when the electronic device 100 is deformed based on the first loading case. The external parameters include the relative positions and the relative rotations between the sensing circuits 110A to 110C.

Similarly, when the electronic device 100 is deformed based on a second loading case, the sensing circuits 110A to 110C obtains a second image group captured by the cameras of the sensing circuits 110A to 110C. The processor 150 then obtains a second testing external parameter group corresponding to the second loading case according to the images captured by the sensing circuits 110A to 110C when the electronic device 100 is deformed based on the second loading case.

In this way, the electronic device 100 obtains several groups of testing external parameters corresponding to several different loading cases according to several groups of images captured by cameras of the sensing circuits.

In operation S419, a linking relationship is established between the several testing strain sensing value groups and the several groups of external parameters based on the several loading cases. In some embodiments, the processor 150 as illustrated in FIG. 1 establishes a linking relationship between the testing strain sensing values obtained in operation S415 and the testing external parameters obtained in operation S417 based on the deformation state D1.

In some embodiments, after the linking database is initialized, the linking relationship between the several testing strain sensing value groups and the several groups of testing external parameters based on the several loading cases is established.

In an embodiment, the linking database is as following.

TABLE 1

| loading case | testing strain sensing values | testing external parameters |
|---|---|---|
| loading case 1 | first testing strain sensing value group | first testing external parameter group |
| loading case 2 | second testing strain sensing value group | second testing external parameter group |
| . . . | . . . | . . . |

In some embodiments, the processor 150 establishes the linking database according to Table 1 by methods such as association rules mining, linear regression, or neural network algorithms. In some embodiments, the linking database, such as Table 1 as mentioned above, is stored in the memory 170 as illustrated in FIG. 1.

Figure 6:
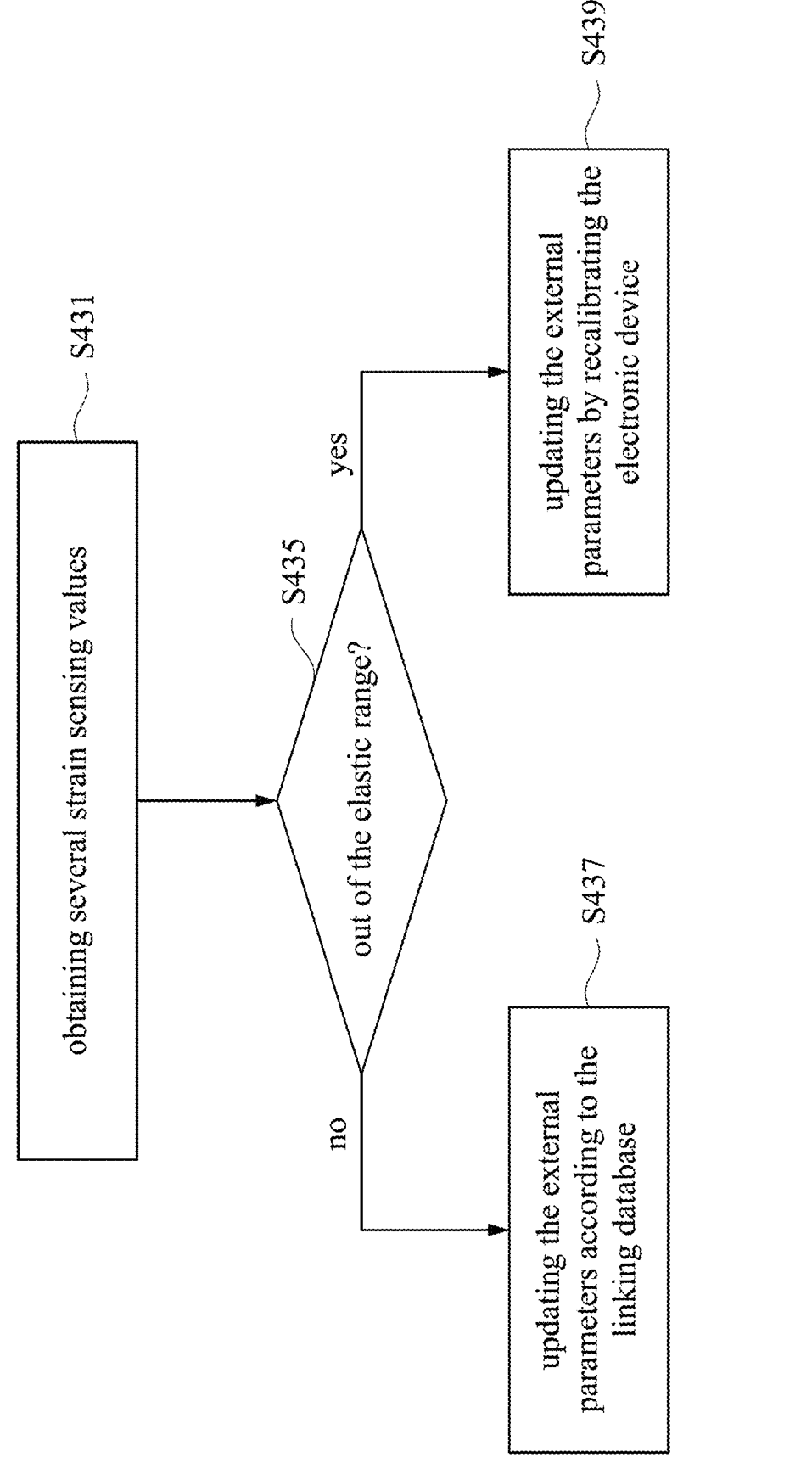
FIG. 6 is a flow chart illustrating an operation as illustrated in FIG. 4 in accordance with some embodiments of the present disclosure.

Reference is made back to FIG. 4 again. In operation S430, the external parameters are updated. In some embodiments, operation S430 is performed when the electronic device 100 is out of the factory and when the user U is operating the electronic device 100 as illustrated in FIG. 2. Reference is made to FIG. 6 together. FIG. 6 is a flow chart illustrating operation S430 as illustrated in FIG. 4 in accordance with some embodiments of the present disclosure. As illustrated in FIG. 6, operation S430 includes operations S431 to S439.

In operation S431, several strain sensing values are obtained. In some embodiments, when the electronic device 100 is deformed when the user U as illustrated in FIG. 2 is operating the electronic device 100 as illustrated in FIG. 1, the strain sensing circuits 130A and 130B obtains several strain sensing values of the electronic device 100.

In some embodiments, the strain sensing circuits 130A and 130B obtains and monitors the several strain sensing values of the electronic device 100 in real time. In some embodiments, the strain sensing circuits 130A and 130B obtains the several strain sensing values of the electronic device 100 every fixed period of time. In some embodiments, the strain sensing values include the strain values sensed by the strain sensing circuits 130A to 130B set on the electronic device 100 when the electronic device 100 is deformed.

In operation S435, it is determined whether the deformation is out of the elastic range. In some embodiments, operation S435 is performed by the processor 150 as illustrated in FIG. 1. When it is determined that the deformation of the electronic device 100 as illustrated in FIG. 1 is out of the elastic range, operation S439 is performed, and the external parameters are updated by recalibrating the electronic device 100. On the other hand, when it is determined that the deformation of the electronic device 100 as illustrated in FIG. 1 is within the elastic range, operation S437 is performed, and the external parameters are updated according to the linking database stored in the memory 170.

In some embodiments, the processor 150 determines whether the deformation of the electronic device 100 is out of the elastic range according to the train sensing values. In some embodiments, when the processor 150 determines that the strain sensing values corresponds to none of the testing strain sensing value groups as illustrated in Table 1, the processor 150 determines that the deformation of the electronic device 100 is out of the elastic range.

In some other embodiments, the processor 150 determines that the deformation of the electronic device 100 is out of the elastic range when at least one of the strain sensing values is larger than an elastic threshold.

In some embodiments, the processor 150 determines whether the deformation of the electronic device is out of the elastic range according to the testing external parameter groups in correspondence to the testing strain sensing values.

Figure 7:
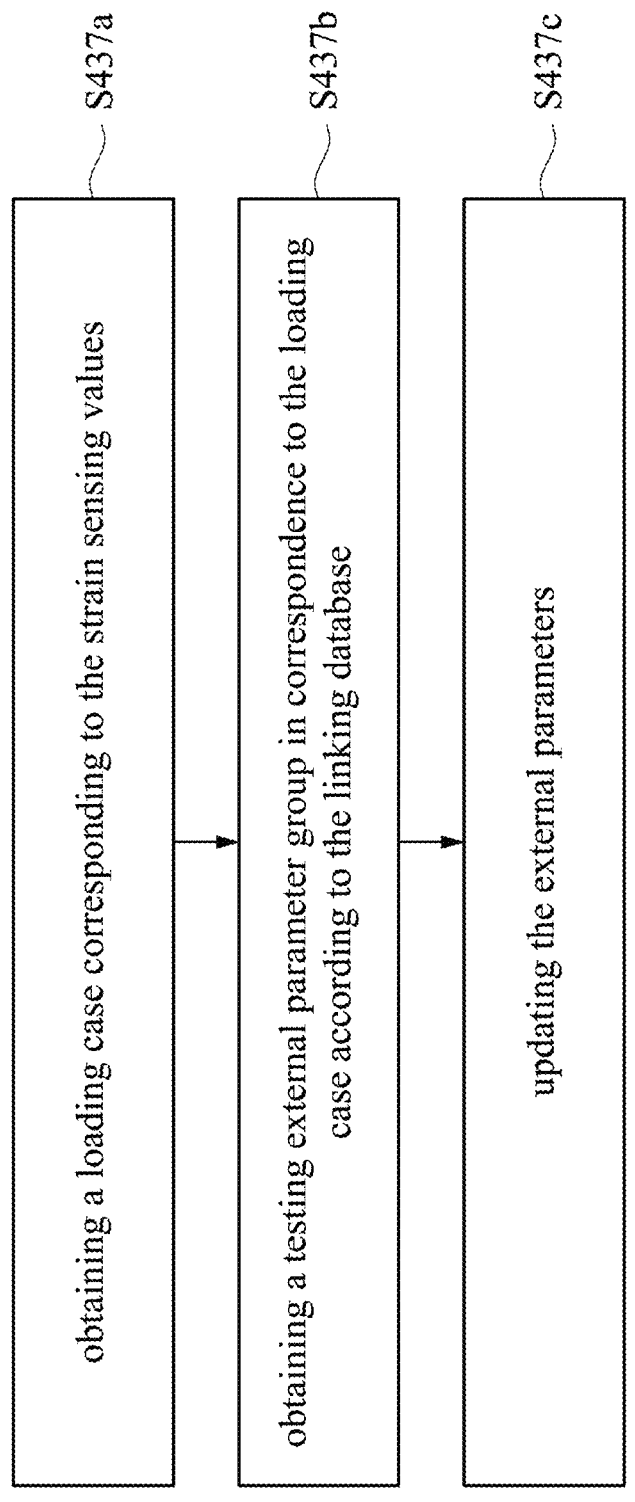
FIG. 7 is a flow chart illustrating an operation as illustrated in FIG. 6 in accordance with some embodiments of the present disclosure.

In operation S437, the external parameters of the sensing circuits are updated according to the linking database. Reference is made to FIG. 7 together. FIG. 7 is a flow chart illustrating operation S437 as illustrated in FIG. 6 in accordance with some embodiments of the present disclosure. As illustrated in FIG. 7, operation S437 includes operations S437a to S437c.

In operation S437a, a loading case corresponding to the strain sensing values is obtained. In some embodiments, the processor 150 as illustrated in FIG. 1 determines the deformation state corresponding to the strain sensing values according to the linkage database stored in the memory 170 as illustrated in FIG. 1.

For example, in some embodiments, the processor 150 compares the strain sensing values to several groups of the testing strain sensing values in Table 1. When the strain sensing values are similar to the first testing strain sensing value group, the processor 150 determines that the strain sensing values correspond to the first testing strain sensing value group and the first loading case. When the strain sensing values are similar to the second testing strain sensing value group o, the processor 150 determines that the strain sensing values correspond to the second testing strain sensing value group and the second loading case.

In some embodiments, when the difference between the strain sensing values and the first testing strain sensing value group is smaller than a difference threshold, the processor 150 determines that the strain sensing values correspond to the first loading case. Similarly, when the difference between the strain sensing values and the second testing strain sensing value group is smaller than the difference threshold, the processor 150 determines that the strain sensing values correspond to the second loading case.

In some other embodiments, the processor 150 determines the loading case corresponding to the strain sensing values by methods such as association rules mining, linear regression, or neural network algorithms.

In operation S437b, a testing external parameter group in correspondence to the loading case is obtained according to the linking database. In some embodiments, the processor 150 determines the testing external parameter group in correspondence to the loading case according to the linking database such as the Table 1 as mentioned above.

In some other embodiments, the processor 150 determines the testing external parameter groups in correspondence to the strain sensing values according to the linking database such as the Table 1 as mentioned above. For example, based on the first testing strain sensing value group, the first the testing external parameter groups in correspondence to the first testing strain sensing value group is obtained.

In operation S437c, the external parameters are updated. For example, in operation S437b, it is determined that the first external parameter group corresponds to the strain sensing values, the processor 150 as illustrated in FIG. 1 updates the external parameters between the sensing circuits 110A to 110C according to the first external parameter group.

In some other embodiments, when the association rule mining between the testing external parameters and the testing strain sensing values is established, the processor 150 may obtains the testing external parameter group in correspondence to the strain sensing values through the association rule mining method.

Through operations S437a to S437c, the external parameters between the sensing circuits 110A to 110C may be updated according to the linking database without switching on the cameras of the sensing circuits 110A to 110C. Therefore, the processor 150 does not need to analyze the external parameters according to the images captured by the sensing circuits 110A to 110C, which is faster than the traditional methods and the external parameters are updated in real time, which improves the operational efficiency of the electronic device 100. Moreover, when the sensing circuits 110A to 110C do not include the camera circuits, the external parameters of the sensing circuits 110A to 110C may be updated according to the linking database.

Figure 8:
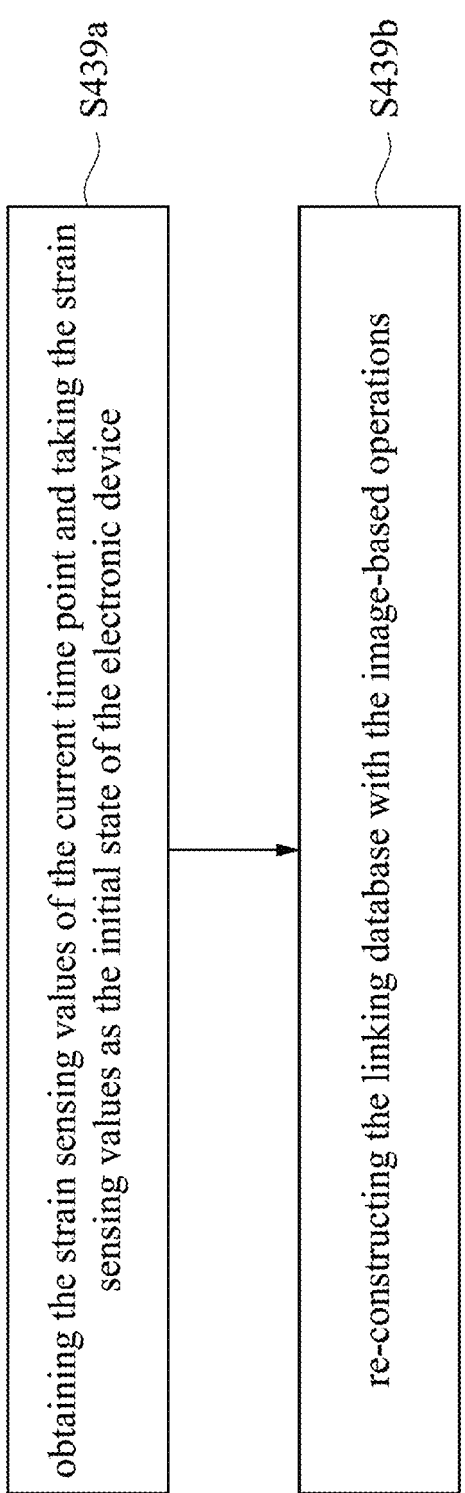
FIG. 8 is a flow chart illustrating an operation as illustrated in FIG. 6 in accordance with some embodiments of the present disclosure.

In operation S439, the external parameters are updated by recalibrating the electronic device. Reference is made to FIG. 8 together. FIG. 8 is a flow chart illustrating operation S439 as illustrated in FIG. 6 in accordance with some embodiments of the present disclosure. As illustrated in FIG. 8, operation S439 includes operations S439a to S439b.

In operation S439a, the strain sensing values of the current time point are obtained and are taken as the initial state of the electronic device. In some embodiments, the strain sensing circuits 130A and 130B obtain the strain sensing values of the current time point, and the strain sensing values of the current time point are taken as the initial state of the electronic device 100 by the processor 150.

In operation S439b, the linking database is re-constructed with the image-based operations. The detail of operation S439b is similar to the operations S415, S417, and S419 as illustrated in FIG. 5.

Through the operations of various embodiments described above, an electronic device, a parameter calibration method, and a non-transitory computer readable storage medium are implemented. The external parameters between the sensing circuits of the electronic device can be recalibrated when the electronic device is deformed. When the deformation of the electronic device is within the elastic range of the electronic device, the external parameters between the sensing circuits may be updated according to the linking database without switching on the cameras of the sensing circuits. Therefore, the processor does not need to analyze the external parameters according to the images captured by the sensing circuits, which is faster than the traditional methods and the external parameters are updated in real time, and the operational efficiency of the electronic device is improved. Moreover, when the sensing circuits do not include the camera circuits, the external parameters of the sensing circuits may be updated according to the linking database.

On the other hand, when the deformation of the electronic device is out of the elastic range, the external parameters between the sensing circuits may be updated according to the images captured by the cameras of the sensing circuits, which may be time consuming. However, since the deformation of the electronic device 100 is out of the elastic range and the linking database stored in the memory 170 is no longer suitable. By performing the recalibration operations with the cameras of the sensing circuits 110A to 110C, the external parameters between the sensing circuits 110A to 110C may be updated.

It should be noted that in the operations of the above-mentioned parameter calibration method 400, no particular sequence is required unless otherwise specified. Moreover, the operations may also be performed simultaneously or the execution times thereof may at least partially overlap.

Furthermore, the operations of the parameter calibration method 400 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processing circuits and coded instructions), which will typically include transistors or other circuit elements that are configured in such a way as to control the operation of the circuitry in accordance with the functions and operations described herein.

Although the present disclosure has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structured of the present invention without departing from the scope or spirit of the invention. In view of the foregoing, it is intended that the present invention cover modifications and variations of this invention provided they fall within the scope of the following claims.

What is claimed is:

1. An electronic device, comprising:
a plurality of sensing circuits, configured to obtain a plurality of sensing values so as to obtain a pose of the electronic device within an environmental coordinate system of a real space;
a plurality of strain sensing circuits, configured to obtain a plurality of strain sensing values in correspondence to a deformation of the electronic device;
a memory, configured to store a linking database, wherein the linking database comprises a linking relationship between a plurality of testing strain sensing value groups of the plurality of strain sensing circuits and a plurality of testing external parameter groups of the plurality of sensing circuits in correspondence; and a processor, coupled to the plurality of sensing circuits, the plurality of strain sensing circuits and the memory, configured to:

update a plurality of external parameters between the plurality of sensing circuits according to the plurality of strain sensing values and the linking database so as to obtain the pose of the electronic device within the environmental coordinate system accurately, wherein when obtaining the pose of the electronic device, the plurality of external parameters between the plurality of sensing circuits are considered.

2. The electronic device of claim 1, wherein the processor is further configured to:

obtain a first testing strain sensing value group of the plurality of testing strain sensing value groups corresponding to the plurality of strain sensing values;

obtain a first testing external parameter group of the plurality of testing external parameter groups in correspondence to the first testing strain sensing value group according to the linking database; and update the plurality of external parameters between the plurality of sensing circuits according to the first testing external parameter group.

3. The electronic device of claim 1, wherein the processor is further configured to:

establish the linking database according to the plurality of testing strain sensing value groups and the plurality of testing external parameter groups in correspondence based on a plurality of loading cases.

4. The electronic device of claim 3, wherein the processor is further configured to:

obtain a first testing strain sensing value group based on a first loading case of the plurality of loading cases by the plurality of strain sensing circuits;

obtain a first testing external parameter group corresponding to the first loading case according to a plurality of images captured by a plurality of cameras of the plurality of sensing circuits when the electronic device is deformed based on the first loading case; and establish the linking relationship between the first testing strain sensing value group and the first testing external parameter group based on the first loading case.

5. The electronic device of claim 1, wherein the processor is further configured to:

perform a structural stress analysis to the electronic device so as to obtain a plurality of representative positions of the electronic device;

wherein the plurality of strain sensing circuits are set at the plurality of representative positions.

6. The electronic device of claim 1, wherein the processor is further configured to:

update the plurality of external parameters according to the linking database when the deformation of the electronic device is within an elastic range; and re-construct the linking database when the deformation of the electronic device is not within the elastic range.

7. The electronic device of claim 6, wherein the processor is further configured to:

determine whether the deformation of the electronic device is within the elastic range according to the linking database.

8. A parameter calibration method, suitable for an electronic device, comprising:

obtaining a plurality of sensing values so as to obtain a pose of the electronic device within an environmental coordinate system of a real space by a plurality of sensing circuits of the electronic device;

obtaining a plurality of strain sensing values in correspondence to a deformation of the electronic device by a plurality of strain sensing circuits of the electronic device;

storing a linking database by a memory of the electronic device, wherein the linking database comprises a linking relationship between a plurality of testing strain sensing value groups of the plurality of strain sensing circuits and a plurality of testing external parameter groups of the plurality of sensing circuits in correspondence; and updating a plurality of external parameters between the plurality of sensing circuits by a processor of the electronic device according to the plurality of strain sensing values and the linking database so as to obtain the pose of the electronic device within the environmental coordinate system accurately, wherein when obtaining the pose of the electronic device, the plurality of external parameters between the plurality of sensing circuits are considered.

9. The parameter calibration method of claim 8, further comprising:

obtaining a first testing strain sensing value group of the plurality of testing strain sensing value groups corresponding to the plurality of strain sensing values;

obtaining a first testing external parameter group of the plurality of testing external parameter groups in correspondence to the first testing strain sensing value group according to the linking database; and updating the plurality of external parameters between the plurality of sensing circuits according to the first testing external parameter group.

10. The parameter calibration method of claim 8, further comprising:

establishing the linking database according to the plurality of testing strain sensing value groups and the plurality of testing external parameter groups in correspondence based on a plurality of loading cases.

11. The parameter calibration method of claim 10, further comprising:

obtaining a first testing strain sensing value group based on a first loading case of the plurality of loading cases by the plurality of strain sensing circuits;

obtaining a first testing external parameter group corresponding to the first loading case according to a plurality of images captured by a plurality of cameras of the plurality of sensing circuits when the electronic device is deformed based on the first loading case; and establishing the linking relationship between the first testing strain sensing value group and the first testing external parameter group based on the first loading case.

12. The parameter calibration method of claim 8, further comprising:

performing a structural stress analysis to the electronic device so as to obtain a plurality of representative positions of the electronic device;

wherein the plurality of strain sensing circuits are set at the plurality of representative positions.

13. The parameter calibration method of claim 8, further comprising:

updating the plurality of external parameters according to the linking database when the deformation of the electronic device is within an elastic range; and re-constructing the linking database when the deformation of the electronic device is not within the elastic range.

14. The parameter calibration method of claim 13, further comprising:

determining whether the deformation of the electronic device is within the elastic range according to the linking database.

15. A non-transitory computer readable storage medium, wherein the non-transitory computer readable storage medium comprises one or more computer programs stored therein, and the one or more computer programs can be executed by one or more processors so as to be configured to operate a parameter calibration method, wherein the parameter calibration method comprises:

obtaining a plurality of sensing values so as to obtain a pose of an electronic device within an environmental coordinate system of a real space by a plurality of sensing circuits of the electronic device;

obtaining a plurality of strain sensing values in correspondence to a deformation of the electronic device by a plurality of strain sensing circuits of the electronic device;

storing a linking database by a memory of the electronic device, wherein the linking database comprises a linking relationship between a plurality of testing strain sensing value groups of the plurality of strain sensing circuits and a plurality of testing external parameter groups of the plurality of sensing circuits in correspondence; and updating a plurality of external parameters between the plurality of sensing circuits by a processor of the electronic device according to the plurality of strain sensing values and the linking database so as to obtain the pose of the electronic device within the environmental coordinate system accurately, wherein when obtaining the pose of the electronic device, the plurality of external parameters between the plurality of sensing circuits are considered.

16. The non-transitory computer readable storage medium of claim 15, wherein the parameter calibration method further comprises:

obtaining a first testing strain sensing value group of the plurality of testing strain sensing value groups corresponding to the plurality of strain sensing values;

obtaining a first testing external parameter group of the plurality of testing external parameter groups in correspondence to the first testing strain sensing value group according to the linking database; and updating the plurality of external parameters between the plurality of sensing circuits according to the first testing external parameter group.

17. The non-transitory computer readable storage medium of claim 15, wherein the parameter calibration method further comprises:

establishing the linking database according to the plurality of testing strain sensing value groups and the plurality of testing external parameter groups in correspondence based on a plurality of loading cases, comprising:

obtaining a first testing strain sensing value group based on a first loading case of the plurality of loading cases by the plurality of strain sensing circuits;

obtaining a first testing external parameter group corresponding to the first loading case according to a plurality of images captured by a plurality of cameras of the plurality of sensing circuits when the electronic device is deformed based on the first loading case; and establishing the linking relationship between the first testing strain sensing value group and the first testing external parameter group based on the first loading case.

18. The non-transitory computer readable storage medium of claim 15, wherein the parameter calibration method further comprises:

performing a structural stress analysis to the electronic device so as to obtain a plurality of representative positions of the electronic device;

wherein the plurality of strain sensing circuits are set at the plurality of representative positions.

19. The non-transitory computer readable storage medium of claim 15, wherein the parameter calibration method further comprises:

updating the plurality of external parameters according to the linking database when the deformation of the electronic device is within an elastic range; and re-constructing the linking database when the deformation of the electronic device is not within the elastic range.

20. The non-transitory computer readable storage medium of claim 19, wherein the parameter calibration method further comprises:

determining whether the deformation of the electronic device is within the elastic range according to the linking database.

* * * * *